Sept. 3, 1968    F. L. SUHAY    3,399,664

SOLAR HEATER

Filed Aug. 8, 1966

INVENTOR.
FRANK L. SUHAY,
BY
ATTORNEY

United States Patent Office 3,399,664
Patented Sept. 3, 1968

3,399,664
SOLAR HEATER
Frank L. Suhay, Burbank, Calif., assignor to Farbenfabriken Bayer Aktiengesellschaft, Leverkusen, Germany, a corporation of Germany
Filed Aug. 8, 1966, Ser. No. 571,955
2 Claims. (Cl. 126—271)

ABSTRACT OF THE DISCLOSURE

The invention comprises a solar heater having a casing the base of which is formed by molding or otherwise with a fluid ductway, the ductway communicating with the surface of the base. Outlet and inlet conduits are provided at the ends of the ductway and overlying the ductway is a high heat conducting metal plate which encloses the ductway.

---

The present invention relates to solar heaters and has for an object a solar heater which may be fabricated with a minimum of expense and erected on the job or delivered to a site fully assembled.

A further object is the provision of a solar heater of attractive appearance and which does not detract from surrounding objects such as trees, dwellings and the like.

Primarily the solar heater of the invention may be used for the heating of water in a pool, particularly when it is desired that the pool water be maintained at a temperature during both summer and winter months. It is a known fact that the average electrical or gas heater for heating pool water performs at great expense even for a small pool whereas the present solar water heater depends on solar energy and the efficient use thereof for the heating of water.

An object of the invention is the provision of a solar water heater adapted to absorb a maximum of solar heat and the efficient use of said heat in the heating of water or other fluids.

A further object is the provision of a solar water heater of light weight which may be assembled in units as needed, which may be used in such a manner as to provide a patio cover, or a carport cover and which may be installed either by a professional or by the individual without the necessity of providing special structural basing supports and wherein lightweight frames may be utilized.

With the above and other objects in view, the invention consists in the novel and useful provision, formation, construction, association, and relative arrangement of parts, members and features, all as shown in certain embodiments in the accompanying drawing, described generally, and more particularly pointed out in the claims.

Figure 3:
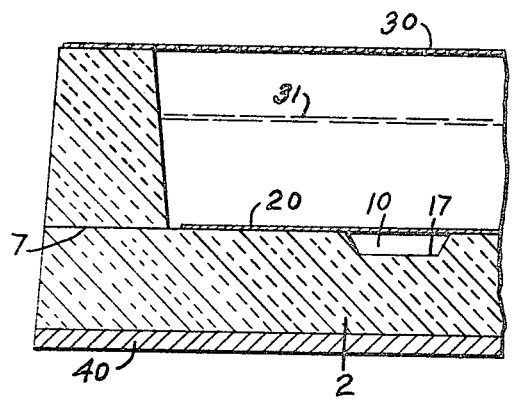
FIGURE 3 is a fragmentary sectional view on an enlarged scale, taken on the line 3—3 of FIGURE 1.

Referring now to the drawing, a solar water heater unit 1 includes a shallow flat casing having a base 2 and encircling side and end walls 3, 4, 5 and 6. The casing may be molded to form so that the end and side walls are integral with the base or the side and end walls may be separate therefrom but secured together as indicated in FIGURE 3 at 7, and in any appropriate manner such as by mechanical bond or by gluing.

Figure 1:
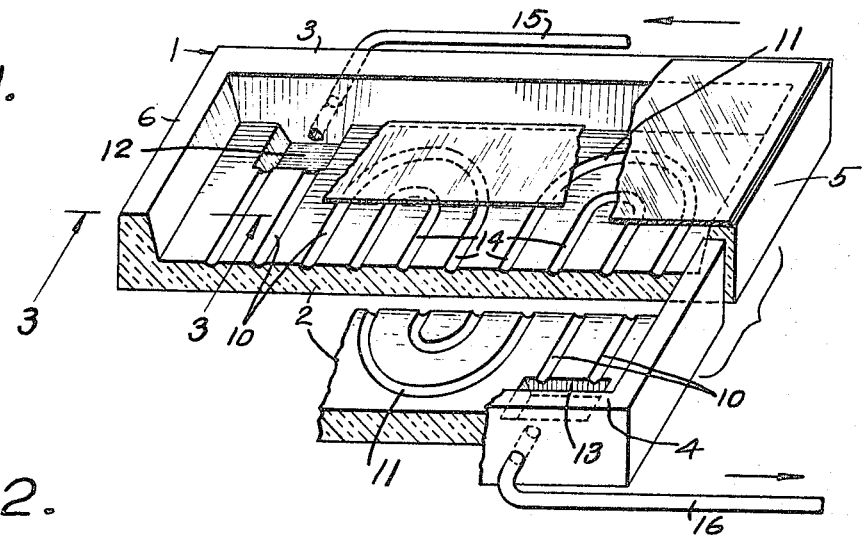
FIGURE 1 is a fragmentary, partially sectional perspective view of one unit of the solar heater of the invention.
Figure 4:
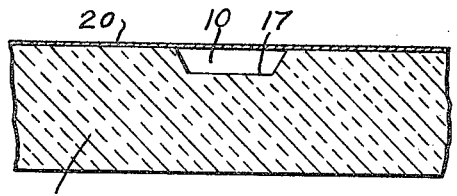
FIGURE 4 is an enlarged, fragmentary sectional view of a portion of the base of the solar water heater; and, FIGURE 5 is a modified form of the heater shown in FIGURE 4.
Figure 5:
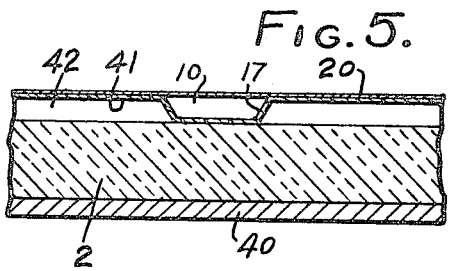

The casing 1 as an entirety, is formed from an insulating material which may be a plastic such as polystyrene, expanded polystyrene beads, cork, or other material. The base 2 is so molded or formed as to provide ducts, channels, or ways 10 which ducts may be of serpentine form as shown at 11, and which ducts communicate with depressed well portions 12 and 13 for inlet to said ducts and outlet therefrom. Depending upon the area of the base of the unit, multiple ducts may be arranged in parallel relationship, as shown in FIGURE 1 at 14, the ducts all communicating with the inlet and the outlet wells 12 and 13. The side walls 3 and 4 are bored to allow communication of an inlet conduit 15 with the well 12 and an outlet conduit 16 with the well 13. The section of each duct may vary in geometrical cross section, however, that shown in FIGURES 3 to 5 inclusive is of polygonal form, as shown at 17. Overlying the base 2 and in contact therewith so as to cover all of the ducts, is a thin plate 20 of metallic material having a high thermo conductivity. I prefer to use copper and a thin sheet thereof due to inexpensiveness, as copper has a higher thermo conductivity than most metals other than silver. As shown, the thin plate of copper may or may not be bonded to the base 2 but said sheet constitutes a means totally overlying the base within the marginal limits of the side and end walls. To further enhance the overall efficiency of the solar heater, I provide either a thin transparent plastic sheet or a thin sheet of glass at 30 resting on the top of the side and end walls and above the metallic plate 20. As generally known, glass is athermanous, that is, opaque to heat rays and consequently the interior of the casing is heated or warmed while the objects within the casing, because of low temperature of the waves, are too long to be transmitted by the glass. While I have shown in FIGURE 3 the use of an additional clear plastic unit 31 interposed between the metallic plate 20 and the unit 30, this is for illustrative purposes only. Various refinements of construction may be utilized such as providing the base of the shallow flat casing with reinforcement or stiffening members 40, as shown in FIGURES 3 and 5. Stiffening members would be utilized for various types of insulation for the casing, particularly if the base 2 was subject to shear.

In FIGURE 5 I have shown a modified construction wherein a formed plastic 41 provides a space 42 between plastic 41 and the top of the base 2. It is well-known that air is a poor conductor of heat and the space 42 aids in this regard against dissipation of heat. Also, in FIGURE 5, the metallic member 20 may be chemically or mechanically bonded to the formed plastic.

Figure 2:
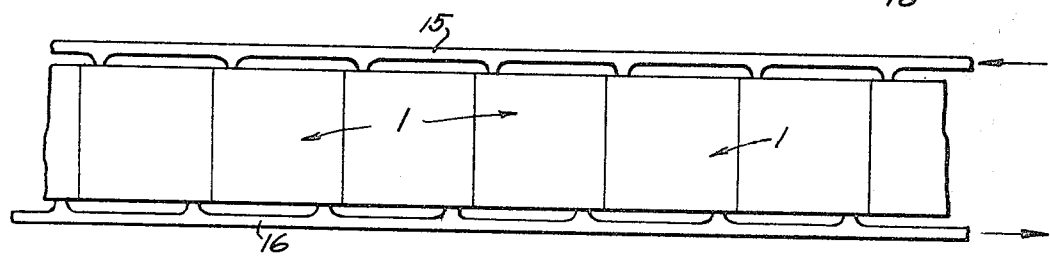
FIGURE 2 is a fragmentary plan view of a series of connected solar water heaters.

In FIGURE 2 I have shown a series of the units of the character shown in FIGURE 1, interconnected with inlets and outlets leading to said units. Thus, individual units may be interconnected to provide any size solar heater whether it is for water, gas, or other fluids to the end that the desired size of solar heater may be corrected on the site in accordance with heating requirements.

The operation, uses, and advantages of the invention are as follows.

A considerable savings in heater construction results due to the fact that the casing 2 may be molded to form from insulation material with the ducts or channels molded in the base thereof. The walls leading to the intake and to the outlet from said ducts or channels is also molded into the top surface of the base of the casing. Thus, initial forming of the casing provides the ductways. The thin metallic plate which may be copper overlies and is bonded either chemically or mechanically to the top surface of the base and substantially covers an area equal to the interior area of the base, as shown in FIGURES 3, 4 and 5. It is known that copper is an excellent heat conductor and as a consequence, the metallic plate rapidly conducts radiant heat from the sun to the fluid within the duct ways. The large area of the plate 20 aids in heating fluid in the ducts as the plate overlaps the ducts and rests on the insulation base 2. Thus the plate continuously transfers heat to fluid in the ducts as the large plate area affords a constant source of heat supply from areas adjacent the ducts. By providing the glass 30 overlying the interior of the casing, the heat is concentrated within the space included between the metallic plate and the glass without heat loss and, as stated, affords an efficient solar water heater at less expense than the average solar water heater which uses pipes adapted to be heated by solar radiation as the pipes have less area of direct contact with the solar rays.

I claim:
1. A solar heater including: a substantially shallow flat casing of heat-insulating plastic material that is substantially impermeable to the fluids to be conducted; said casing having a base and surrounding side and end walls; said base having a ductway for fluids formed in its upper surface; a fluid inlet and a fluid outlet connected to the ductway; and a flat metallic plate of high heat conductivity overlying said base and closing the top of said plastic ductway.

2. The invention defined in claim 1, wherein the heat-insulating material of said base is expanded polystyrene beads, and the metallic plate is of copper.

References Cited

UNITED STATES PATENTS

| 1,889,238 | 11/1932 | Clark | 126—271 |
| 2,358,476 | 9/1944 | Routh et al. | 126—271 |
| 3,039,453 | 6/1962 | Andrassy | 126—271 |
| 3,076,450 | 2/1963 | Gough et al. | 126—271 |

FOREIGN PATENTS

| 621,392 | 2/1927 | France. |

CHARLES J. MYHRE, *Primary Examiner.*

UNITED STATES PATENT OFFICE
CERTIFICATE OF CORRECTION

Patent No. 3,399,664                                September 3, 1968

Frank L. Suhay

It is certified that error appears in the above identified patent and that said Letters Patent are hereby corrected as shown below:

In the heading to the printed specification, lines 3 to 5, "Burbank, Calif., assignor to Farbenfabriken Bayer Aktiengesellschaft, Leverkusen, Germany, a corporation of Germany" should read -- 1816 N. Rose St., Burbank, Calif. 91505 --.

Signed and sealed this 23rd day of September 1969.

(SEAL)
Attest:

Edward M. Fletcher, Jr.                    WILLIAM E. SCHUYLER, JR.
Attesting Officer                                  Commissioner of Patents